United States Patent [19]

McDaniel et al.

[11] Patent Number: 4,659,690

[45] Date of Patent: Apr. 21, 1987

[54] ACID AGGLOMERATION OF REFRACTORY GEL IN POLAR ORGANIC DILUENT

[75] Inventors: Max P. McDaniel; Emory W. Pitzer, both of Bartlesville, Okla.

[73] Assignee: Phillips Petroleum Company, Bartlesville, Okla.

[21] Appl. No.: 685,411

[22] Filed: Dec. 24, 1984

Related U.S. Application Data

[63] Continuation-in-part of Ser. No. 565,070, Dec. 23, 1983, abandoned.

[51] Int. Cl.$^4$ .......................... B01J 21/04; B01J 31/00; B01J 27/24; B01J 27/14
[52] U.S. Cl. .................... 502/439; 502/150; 502/200; 502/208; 502/210; 502/224; 502/256; 502/319; 264/117
[58] Field of Search ............... 502/150, 200, 210, 224, 502/256, 319, 439, 208; 264/117

[56] References Cited

U.S. PATENT DOCUMENTS

| | | | |
|---|---|---|---|
| 3,065,595 | 11/1962 | Gary | 423/213.2 X |
| 3,803,283 | 4/1974 | Takewell et al. | 264/117 |
| 3,846,540 | 11/1974 | Leach | 423/628 |
| 3,904,550 | 9/1975 | Pine | 252/437 |
| 3,979,504 | 9/1976 | Ziegenhain et al. | 423/628 |
| 4,113,661 | 9/1978 | Tamm | 252/465 |
| 4,206,297 | 6/1980 | Hoff et al. | 526/106 |
| 4,289,652 | 9/1981 | Hunter et al. | 252/437 |
| 4,364,841 | 12/1982 | McDaniel et al. | 252/430 |
| 4,364,842 | 12/1982 | McDaniel et al. | 252/430 |
| 4,364,854 | 12/1982 | McDaniel et al. | 252/437 |
| 4,472,531 | 9/1984 | Spech et al. | 502/256 |

*Primary Examiner*—Andrew H. Metz
*Assistant Examiner*—William G. Wright
*Attorney, Agent, or Firm*—A. L. Robbins

[57] ABSTRACT

Fines are reduced in refractory materials by mixing the refractory material with an acid composition in a liquid polar organic compound and thereafter working the mixture until a decrease in volume occurs. The resulting product can be shaped and subjected to conventional finishing treatments. The resulting product exhibits reduced fines and thus is an improved material for use as a catalyst support. The resulting catalyst is of particular utility in the production of film grade ethylene polymer.

57 Claims, No Drawings

ACID AGGLOMERATION OF REFRACTORY GEL IN POLAR ORGANIC DILUENT

This application is a continuation-in-part of application Ser. No. 565,070, filed Dec. 23, 1983, now abandoned.

BACKGROUND OF THE INVENTION

This invention relates to the production of refractory material used for catalysts and catalyst supports.

Refractory materials are conventionally used as catalysts and catalyst supports. Such materials, however, suffer the disadvantage of producing fines when the catalyst is subjected to normal handling operations. The fines present several problems in that they complicate the activation procedures, feed erratically to the reactor, and result in the production of polymer fines when the catalyst is used in polymerization. This problem is particularly acute in supports used for olefin polymerization catalysts which generally cannot be subjected to treatments involving the use of water to reduce fines. The invention is of particular applicability for aluminum phosphate supports for olefin polymerization catalysts which demonstrate exceptional polymerization activity but do suffer from the disadvantage of producing fines during handling due to inherent weakness of the particles.

SUMMARY OF THE INVENTION

It is an object of this invention to produce an improved refractory composition suitable for use in catalytic processes; it is a further object of this invention to provide an improved aluminum phosphate gel; it is a further object of this invention to provide an improved aluminum phosphate support for chromium olefin polymerization catalysts; it is yet a further object of this invention to provide an improved polymerization process; and it is still yet a further object of this invention to provide an improved method of producing aluminum phosphate gel.

In accordance with this invention, a refractory material is mixed with a polar organic liquid acid composition, worked until a reduction in volume occurs, and dried.

DESCRIPTION OF THE PREFERRED EMBODIMENTS

In one aspect, this invention involves the treatment of an already produced refractory xerogel prior to activation. This treatment comprises: (1) combining an acid composition in a liquid polar organic compound with the particulate refractory material to give a workable mixture; (2) working the mixture, for instance by stirring, during which time a decrease in volume occurs; (3) shaping the material into beads, pellets, extrudate, bricks or other shapes; (4) drying the shaped mixture; and (5) subjecting the dried product to conventional treatment such as grinding and calcining.

The polar organic compound can be an ester, ketone, aldehyde, alcohol or other normally liquid polar organic compound or mixture thereof. Alcohols are preferred, particularly 1-6 carbon atom alkanols, most preferably methanol because of its hydrophillic nature.

The acid can be either a mineral acid such as nitric acid or hydrochloric acid or sulfuric acid or it can be an organic acid, such as acetic acid, oxalic acid or propionic acid, for instance. Alternatively, instead of an acid as such, a compound imparting acidic characteristics to the composition can be used to produce the acid composition. For instance, chromium nitrate can be used to provide both the chromium for the catalyst and the acidic conditions. Generally, the acidic salt will give a pH of 2 to 4 when dissolved in water to form a 0.1 M solution. Examples are chromium (III) nitrate, chromium (VI) oxide, aluminum nitrate, $NH_4H_2PO_4$, aluminum sulfate and chromium sulfate. A particularly preferred acidic material is a fluoride which not only aids in agglomeration but also gives a surface fluoride treatment to the aluminum phosphate which is desirable in some instances to cause branching. Exemplary fluoride compounds are ammonium silicofluoride $(NH_4)_2SiF_6$ and ammonium bifluoride, $NH_4HF_2$. If desired the refractory material can be given a fluoriding treatment and/or a silicating treatment for instance by working in the presence of an organic silicate in combination with the other techniques disclosed herein.

If the purpose is to produce a catalyst base, the amount of acid used is preferably sufficient to give about 0.02 to about 0.5 normality/liter in a polar organic compound. Otherwise any amount of acid short of an amount which will dissolve the entire refractory material can be used.

The working to reduce the volume can be done with any mixing device capable of mixing the composition. The polar organic liquid is preferably used in an amount sufficient to give initial incipient wetness. This is about one volume of liquid per total volume of voids and pore volume of the refractory material. Broadly, liquid in an amount from about 0.1 to 2 times the total volume represented by the voids and the pore volume can be used. Stated another way, the polar organic liquid is preferably used in an amount within the range of 0.3 to 5 preferably 1-3 milliliters per gram of solid particulate refractory material or 1-25 preferably 2-7 milliliters per gram of refractory material on a dry basis when the treatment is done in the gel stage. As the mixing continues, the volume of solids decreases and free liquid is released. The mixing can continue with the mixture getting less viscous because of the free liquid, but preferably, the thus-released liquid is evaporated to keep the consistency the same or more preferably to cause the mass to become more viscous. Eventually, the mass will become, to all outward appearances, a solid, although generally the mixing is stopped short of this point. The reason for this is that in accordance with the invention, voids are reduced and particles are thus agglomerated without significant damage to the pores of the refractory material. Carrying the mixing to the point where the material totally solidifies can result in damage to the pores or in particles which are too strong for being fragmented during polymerization. Stated in terms of mixing time, the mixing time can vary, of course, depending on the intensity, with more intensive mixing requiring less time. Generally 10 minutes to 15 hours, preferably 1 to 3 hours is used.

The terms mixing and working are used herein to describe the procedure employed on the refractory material. In the examples a planetary mixer was used. A granulater has also been used. The procedure is most nearly analgous to kneading bread dough. Hence, machines such as pin granulaters, sigma mixers or banbury-type mixers designed to give intensive working can be utilized.

The refractory material can be either new refractory material or the fines resulting from processing of a refractory material, that is the invention can be applied to a refractory material as produced, or a refractory material (with or without having been agglomerated in accordance with the invention) can have fines separated therefrom and the fines only subjected to treatment in accordance with this invention. These fines can be from raw refractory material as produced or can be from catalyst containing a catalytic agent such as chromium on a support such as silica. For instance fines with a particle diameter of less than 50 microns are frequently produced in catalyst manufacture and are simply discarded. In accordance with this embodiment of this invention they can be used and are essentially comparable to the rest of the catalyst.

In a second embodiment of this invention a hydrogel or a gel wherein the water in the pores has been partially or essentially completely replaced with a water missible volatile liquid organic compound such as an alcohol, preferably 1-6 carbon atom alcohols, is subjected to the same treatment described hereinabove with respect to the particulate solid material. The same scope of refractory materials, acids and polar organic liquids are applicable. As with the first embodiment, the preferred polar organic compound is methanol.

Although on initial working the gel will have a different consistency than the particulate refractory material, on milling or working of the gel it is reduced in volume due to evaporation of the polar liquid and approaches apparent dryness. Hence the same types of mixing equipment can be used as with the first embodiment. In the second embodiment the polar organic compound can simply be the material used for removing water from the hydrogel, these materials being water missible normally liquid volatile polar organic compounds such as alcohols with methanol, as noted hereinabove being preferred. Initially the pores are filled with water i.e. the material is a hydrogel. Milling or mixing can be initiated at this point or after some or essentially all of the water has been displaced with the polar organic compound. The acidic material is combined with the polar organic compound in the same manner as in the first embodiment, preferably using an acidic chromium compound so as to impart chromium to the refractory material. After the treatment is complete the resulting milled or mixed material is dried of remaining liquid and calcined in the same manner as in the first embodiment. Generally, the milled material is introduced into a hammermill or other device utilizing high speed blades or chains to pulverize the material.

There is one difference between the first and second embodiments in that, because the solids content of the gel in the second embodiment is relatively low i.e. 10 to 25 percent generally, greater amount of polar organic compound is used based on the weight of the refractory material on a dry basis. Generally 1 to 20 preferably 2 to 7 milliliters of polar organic liquid per gram of refractory material based on a solid basis is used, as noted above.

The invention is broadly applicable to any refractory material, such as magnesium oxide (magnesia), aluminum phosphate, silica, alumina, titania or combinations thereof, but is of particular applicability to aluminum phosphate or combinations thereof with other refractory materials, i.e. aluminum phosphate/alumina, aluminum phosphate/silica or aluminum phosphate/aluminum phosphate. In the latter instance a combination of aluminum phosphate having a P/Al ratio of from 0.1:1 to 0.4:1 and an aluminum phosphate having a P/Al ratio of from 0.5:1 to 1:1 gives a particularly desirable product. It is noted that aluminum phosphate with an aluminum to phosphorous ratio below 1 is not a mixture of true aluminum phosphate and alumina but rather is unitary matrix structure.

The aluminum phosphate can be produced by combining an aluminum salt with a source of phosphate ions in any manner known in the art. Preferably, however, the aluminum phosphate is produced by combining the aluminum salt and a source of phosphate ions in a concentrated mass followed by neutralization to produce a gel as disclosed in McDaniel et al U.S. Pat, No. 4,364,855 (Dec. 21, 1982) the disclosure of which is hereby incorporated by reference and in McDaniel et al U.S. Pat. No. 4,364,854 (Dec. 21, 1982) the disclosure of which is hereby incorporated by reference.

Briefly, this preferred process involves combining an aluminum salt and a source of orthophosphate ions preferably in a concentrated mass. By concentrated mass is meant a system whereby an aluminum salt which melts is utilized in the molten state or else the ingredients are utilized as a syrup in water with preferably no more than 40 weight percent water based on the weight of aluminum salt being utilized. Even in the melt method it may be desirable to incorporate water and if so this is generally done in an amount of about 1 to 15 weight percent based on the weight of the aluminum salt although up to 20 percent or even up to 40 percent can be utilized.

Generally, hydrated aluminum salts such as hydrated aluminum nitrate are most susceptible to being melted and thus are the preferred source of aluminum ions for the melt method. Aluminum bromide and hydrated aluminum bromate can also be used as can, broadly, any aluminum salt which will melt. Alternatively an aluminum salt which will not necessarily melt but which will dissolve in water to form a syrup as described hereinabove can be utilized. Aluminum sulfate, for instance, is ideally suited for this embodiment of the invention.

The source of phosphate ions can be any source of phosphate ions and is generally orthophosphoric acid or an orthophosphate such as monobasic ammonium phosphate or dibasic ammonium phosphate or mixtures thereof.

The temperature, if a melt is used, can be any temperature at or above which the aluminum compound chosen will melt. The reaction can be carried out in any atmosphere including air or can be carried out under any inert atmosphere for instance. Generally temperatures of 65 to 200, preferably 65° to 100° C. are used.

Neutralization to produce a hydrogel can be carried out using any suitable neutralizing agent but it is generally carried out utilizing ammonia gas or ammonium hydroxide. The hydrogel is dried in a conventional manner to produce a xerogel.

If desired, further reduction in fines can be obtained by using a refractory material gelled in the presence of a water-soluble acrylamide polymer.

The acrylamide polymer can be incorporated, for instance, by means of an aqueous solution thereof which is simply mixed in any order with the aluminum salt and the source of phosphate ions. Alternatively the polymer in the form of a powder can simply be dissolved in the concentrated mass prior to gelling.

The acrylamide polymer is used in an amount calculated on a dry basis of about 1 to 20, preferably 2 to 15, more preferably about 10 weight percent based on the weight of the dry aluminum phosphate produced.

The acrylamide polymer employed can be a homopolymer or a copolymer having a sufficiently high molecular weight such that moderately viscous solutions result when the polymer is dissolved in water. This means solutions having a Brookfield LVF viscosity ranging from about 200 to about 5,000 centipoise at room temperature as 1 wt. % solutions in water (No. 3 spindle at 60 rpm and 23° C., ASTM D 1824).

The functionality of the polymer can be anionic, e.g. sodium acrylate copolymerized with acrylamide, nonionic, presently preferred, and cationic, e.g. beta-methacryloxyethyltrimethylammonium methyl sulfate copolymerized with acrylamide.

Generally, the anionic copolymers are least desired since the alkali metal cation present, if retained by the aluminum phosphate can impair its subsequent catalytic activity.

Also, acrylamide copolymerized with unsaturated carboxylic acid comonomers such as acrylic acid are presently less desirable since it is known that polyvalent cations such as $Al^{+3}$ and $Cr^{+3}$ present in the solution to be gelled can gel a solution of the copolymer. Also N-vinyl-2-pyrrolidone/acrylamide copolymer can be used. The acrylamide will be the predominant monomer in the copolymer, when employed.

If the purpose is to produce a chromium catalyst support, the aluminum and phosphorus components are selected so as to give an atom ratio of phosphorous to aluminum within the range of 0.1:1 to 1:1, preferable 0.2:1 to 0.6:1. Broadly, however, any ratio, for instance from 0.05:1 to 2:1 can be used with orthophosphates and pyrophosphates and with polyphosphates the ratio can be 0.1:1 to 5:1.

When the purpose is to produce a chromium olefin polymerization catalyst the chromium is preferably incorporated by simply utilizing a water soluble chromium compound which is coprecipitated with the refractory material. Suitable chromium compounds include chromium acetate, chromium nitrate and chromium oxide, for instance. Broadly any chromium compound known in the art can be utilized. It is also possible to incorporate the chromium compound as an aqueous solution to the hydrogel after formation thereof or as a hydrocarbon solution to the zerogel. The support of this invention can also be utilized as a base for zerovalent and divalent chromium compounds which, of course, are added after calcination. In any event the refractory material contains a catalytic amount of chromium.

Chromium is generally present in an amount within the range of 0.001 to 10, preferably 0.1 to 5, more preferably about 1 weight percent based on the weight of the dried gel.

After the acid treatment of this invention, the dried product is given a conventional finishing treatment. For instance, it can be activated in the same manner as in the prior art as disclosed in said McDaniel et al patents. Generally where chromium is to be converted to the hexavalent state the chromium-containing xerogel is heated in an oxygen-containing ambient, generally air at a temperature within the range of 300° C. to 800° C., more preferably 300° C. to 600° C. for a time of 1 minute to 48 hours, preferably 0.5 to 10 hours.

The refractory materials produced by the novel method of this invention are particularly suitable as a support for a chromium catalyst for the production of polymers from at least one mono-1-olefin containing 2 to 8 carbon atoms per molecule. The catalysts are of particular applicability in producing ethylene homopolymers using a monomer feed which consists essentially of ethylene and copolymers of ethylene and one or more comonomers selected from mono-1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalysis. One convenient method is to suspend the catalyst in an organic medium and to agitate the mixture to maintain the catalyst in suspension throughout the polymerization process. Typically, predominantly ethylene copolymers are prepared using 0.5-20 weight percent comonomer as described above in the feed. Preferably sufficient comonomer is used to give 97 to 99.6 weight percent polymerized ethylene units in the resulting copolymer.

When the modified phosphate of this invention is used as a catalyst base for a chromium or vanadium olefin polymerization catalyst, the resulting catalyst can be used in conjunction with a cocatalyst if desired. Suitable cocatalysts include organic compounds of Groups IA, II and IIIA of the Periodic Table, primarily aluminum and boron alkyls. The most preferred boron compounds are trihydrocarbylboron compounds, particularly trialkylboron compounds, such as tri-n-butylborane, tripropylborane, and triethylborane (TEB). Suitable aluminum alkyls include $R_3Al$, $R_2AlX$, and $RAlX_2$ where R is a 1 to 12 carbon atom hydrocarbyl radical and X is a halogen preferably chlorine. Triethylaluminum and diethylaluminum chloride are particularly suitable.

For the following examples 1A through 1D, $AlPO_4$ was prepared by contacting an aqueous solution containing sufficient $Al(NO_3)_3$ and $NH_4H_2PO_4$ to give an atom ratio of P/Al of 0.4 with ammonium hydroxide to produce a gel at pH of about 6. The gel was washed with hot (80° C.) water to remove soluble by-products and then with isopropanol to reduce the water content. The treated gel was dried at 80° C. in a vacuum oven and the dry product calcined in air for 3 hours at 400° C. to produce about 10 kg of final product. 100% of it passed through a 35 mesh screen and 80% of it passed through a 200 mesh screen.

EXAMPLE 1A $AlPO_4$ Treated With Hydrated Cr Nitrate In Methanol

1 Kg of the calcined $AlPO_4$ was added to a solution containing 77 g of $Cr(NO_3)_3 \cdot 9H_2O$ in 2000 mL of methanol provide calculated Cr content of about 0.9 wt % based on the dry composite. All of the solution was adsorbed by the $AlPO_4$ to give an apparently dry powder whereupon an additional 1100 mL of methanol was added to bring the mixture to the consistency of wet sand. The mixture was charged to a planetary mixer of nominal 1 to 4 gal capacity (Charles Ross & Son Co., Hauppauge, N.Y.). As the mixture was stirred at about 40 rpm for several hours at room temperature (about 25° C.) the sample volume decreased and its consistency changed. Samples were taken at various times, dried overnight at 80° C. in a vacuum oven and activated (calcined) for 3 hours at 600° C. The bulk density of each sample was determined. The activity of some of the catalysts for ethylene polymerization was tested at about 96° C. in an isobutane diluent in the presence of about 8 ppm triethylborane, based on the diluent. The bulk density of the resulting polymers was also determined.

The results are summarized in Table 1.

TABLE I

| Run No. | Stir Time Min. | Product Consistency | Resulting Bulk Density g/cc | Catalyst Activity g/30 min. | Polymer Bulk Density g/cc |
|---|---|---|---|---|---|
| 1 | 5 | wet sand | 0.31 | 2815 | 0.25 |
| 2 | 20 | soup | 0.31 | —(a) | — |
| 3 | 50 | paste | 0.32 | — | — |
| 4 | 90 | grainy paste | 0.33 | 2770 | — |
| 5 | 160 | thick paste | 0.35 | 3460 | 0.27 |
| 6 | set 18 hrs | solid | 0.39 | 1640 | — |

(a)A dash signifies no determination made.

After being dried overnight the control composition made in Run 1 was soft to the touch and easily crumbled when handled, however gently. The catalyst activity of about 2800 g polyethylene per g solid catalyst per 30 minutes is considered to be representative of the catalyst as well as its bulk density of 0.31 g/cc and the resultant polymer bulk density of 0.25 g/cc, i.e., the treatment was insufficient to reduce fines significantly.

With increasing stirring time, however, the recovered dried compositions became harder until those of Runs 4, 5 set into a "brick" which required considerable effort to break apart. Samples were produced from each brick by rubbing it on a 35 mesh screen, collecting the products, activating them as described before and testing a portion of each in ethylene polymerization. Surprisingly, the samples retained good polymerization activity after the agglomeration treatment which decreased catalyst fines and made the particles more resistant to attrition. In fact, the sample of Run 5, after 160 minutes of stirring, exhibited increased polymerization activity relative to the control catalyst of Run 1. Sample 6 showed the highest catalyst bulk density but a substantially lower polymerization activity indicating the process conditions were probably too severe.

Both catalyst and polymer bulk densities can be increased by the agglomeration treatment. Even after grinding the catalyst it was observed that its average particle size had greatly increased since typically only about 25% passed through a 140 mesh screen whereas 80% of the untreated AlPO$_4$ passed through a 200 mesh screen.

EXAMPLE 1B

The same ingredients and procedure set forth in Example 1A was followed except that the total volume of methanol was decreased from 3100 mL to 2500 mL. The mixture started as a wet powder which changed into a dough after about 1 hour of stirring. As the alcohol evaporated slowly with continued stirring, the large dough ball broke up into smaller ones until beads were formed. These solidified during drying into hard spherical particles. After 150 minutes of stirring, 250 mL of methanol was added to the mixer to bring the beads back to a paste. The paste was stirred 30 minutes, dried into a hard brick, crushed and sieved. All of the crushed material passed through a 35 mesh screen but only 25% of it passed through a 140 mesh screen. The product was activated at 538° C. in a fluidized bed for 3 hours with very little of it being blown over indicating that the catalyst particles were attrition resistant. The activated catalyst was employed in ethylene polymerization in a 10 gal loop reactor at about 95° C. where it yielded 2500–3000 g polyethylene per g catalyst in 1 hour.

The agglomeration treatment increased the bulk density of the catalyst from 0.25 g/cc to 0.40 g/cc.

EXAMPLE 1C

The procedure of Example 1B was repeated except that stirring was stopped after 120 minutes and the resulting soft dough was extruded (pushed) through a 10 mesh screen. This yielded small macaroni-like particles after drying which were broken up and pushed through a 35 mesh screen. Only about 15% of this material passed through a 140 mesh screen indicating that substantial agglomeration of the catalyst particles had been achieved. The catalyst was activated at 600° C. as before and tested in ethylene polymerization as in Example 1A. A polymerization activity of 4660 g polyethylene per g solid catalyst per 30 minutes was obtained, again indicating an improvement in activity over control Run 1 in Example 1A.

EXAMPLE 1D 600 g of the calcined AlPO$_4$ was impregnated with 1500 mL of methanol containing 32 g of dissolved Cr(NO$_3$)$_3$·9H$_2$O to provide a calculated content of about 0.7 wt. % Cr, based on the dry composite. The mixture was stirred for 120 minutes. The material below the blades compacted into a dry brick-like form since it was not stirred whereas the material inside the path of the blades became a dry, agglomerated powder. Both upper and lower catalyst phases were coarse and hard after drying and grinding. They were activated as before at 600° C. and tested in ethylene polymerization as in Example 1A.

The upper phase, exhibiting a bulk density of 0.45 g/cc, produced 3240 g polyethylene per g solid catalyst per 30 minutes having a bulk density of 0.25 g/cc. The lower phase, exhibiting a bulk density of 0.39 g/cc, produced 4600 g polyethylene per g solid catalyst per 30 minutes having a bulk density of 0.27 g/cc.

Both catalyst phases were substantially improved in catalyst activity relative to control Run 1 in Example 1A which produced 2815 g polyethylene per g solid catalyst per 30 minutes. Both catalyst phases produced polymer of noticeably increased average particle size over the control Run 1 catalyst as well as a substantially higher catalyst bulk density than the 0.31 g/cc of the control Run 1 catalyst.

An aluminum phosphate containing 1 wt. % chromium based on the dry composite was prepared as generally described before. That is, an aqueous solution containing Cr(NO$_3$)$_3$ and Al(NO$_3$)$_3$ plus NH$_4$H$_2$PO$_4$ to provide an atom ratio of P/Al of 0.6 was gelled at a pH of about 6 with ammonium hydroxide. The gel was washed, dried, and calcined as before. It was subsequently pushed through a 40 mesh screen. The product, described as calcined catalyst, was then employed as the starting material for Examples 2–8.

It was determined in sieving tests that 100% of the catalyst passed through a 40 mesh screen, 66% passed through a 200 mesh screen and 19% passed through a 325 mesh screen.

EXAMPLE 2

Catalyst Treated With HNO$_3$ In Methanol-Invention 1 kg of calcined catalyst was admixed with a solution containing 3L of methanol, 10 mL of concentrated HNO$_3$ and 20 mL of water. The mixture was stirred for about 2 hours in the planetary mixer as before then removed and dried overnight (about 15 hours) in a vacuum oven at 80° C. The product, which formed a lump was subsequently pushed through a 35 mesh screen. The resulting particles were then activated at 600° C. as before. The bulk density of the catalyst was ascertained and its polymerization activity in producing polyethylene was determined as before in Example 1A.

It was found that the bulk density of the catalyst was 0.46 g/cc whereas that of the untreated control was only 0.32 g/cc.

The invention catalyst produced 3800 g polyethylene per g solid catalyst per 30 minutes using Example 1A reaction conditions. The polymer had a bulk density of 0.27 g/cc.

In two separate tests, the control catalyst 1A produced 2260 g and 2390 g polyethylene per g solid catalyst per 30 minutes under the same polymerization conditions used with the invention catalyst. The polymer had a bulk density of 0.25 g/cc.

Acid agglomeration of the catalyst substantially improved its bulk density and its polymerization activity relative to the untreated control catalyst.

EXAMPLE 3

Catalyst Treated With HNO$_3$ In Water Alone-Control 1 kg of calcined catalyst was added to the planetary mixer at 85° F. (29° C.). A solution consisting of 2.4 L of distilled water and 10 mL of concentrated HNO$_3$ was added to it forming a soupy mush. The mixture was stirred for 1 hour, then about 100 mL of solution which came to the top was poured off and the resulting mushy product was dried overnight at 80° C. in a vacuum oven. The dried catalyst did not form a hard lump. A small portion was activated and tested for polymerization as before.

It was found that the treated catalyst had a bulk density of 0.41 g/cc and it produced 2140 g polyethylene per g solid catalyst per 30 minutes having a bulk density of 0.26 g/cc. In comparison, the control catalyst had a bulk density of 0.32 g/cc and it produced 2260 g polyethylene per g solid catalyst per 30 minutes having a bulk density of 0.25 g/cc.

In this instance, aqueous acid treating the calcined catalyst improved its bulk density but had little effect on polymerization activity, polymer bulk density and catalyst particle size. Thus while bulk density was increased which is associated with improved catalyst properties in the invention runs, no improvement in catalyst properties was noted here in this control run using water.

These results indicate that acidified water is not a suitable medium to use in treating catalysts and catalyst supports when improvement in polymerization activity and particle size are desired. Up to 10 weight percent water can, however, be present with the polar organic compound.

EXAMPLE 4

Catalyst Treated With Methanol Alone-Control 1 kg of calcined catalyst was added to the planetary mixer along with 2L of methanol alone. During stirring for about 2 hours as the mixture slowly compacted as before, it passed through the usual wet sand, dough and paste stages. As it became drier, beads were formed in the stirring path and a cake developed below the mixing blades. The beads were recovered and activated at 600° C. as before. A sample of the activated beads was employed in ethylene polymerization as before. Only 632 g polyethylene per g solid catalyst per 30 minutes was produced, however, and the polymer bulk density was 0.24 g/cc. The catalyst beads were weak and easily crushed.

The catalyst cake from below the mixing blades was recovered and activated at 600° C. as before. After grinding the cake into particles it was observed that many fines were generated and the bulk density of the catalyst was slightly improved to 0.35 g/cc relative to the typical value of about 0.31 for control.

EXAMPLE 5

Catalyst Treated With 5% AlPO$_4$ Made in Situ Comparison 1 kg of calcined catalyst was put in the planetary mixer along with a solution consisting of 2L of methanol, 200 g of Al(NO$_3$)$_3$·9H$_2$O and 22 mL of 85% orthophosphoric acid. The atom ratio of the dissolved aluminum salt and phosphoric acid, P/Al, was 0.6, the same as in the calcined catalyst. The AlPO$_4$ formed as the solution evaporated on drying. The intention was to acid treat the catalyst with the phosphoric acid before the new AlPO$_4$ formed and to cement the catalyst particles together with fresh AlPO$_4$.

The mixture made a slightly wet powder which after stirring about 10 minutes became wetter and more dough-like in texture. Continued stirring resulted in further loss in volume and the mixture became soup-like in appearance. Some of the methanol was evaporated with an air stream while continuing stirring to bring the mixture back to the dough-like state. The mixture was then dried overnight at 80° C. in a vacuum oven where it formed a hard brick. A small portion of the brick was ground with great difficulty, the pieces pushed through a 40 mesh screen and the resulting sized product activated at 600° C. as before.

A portion of the activated catalyst was tested in ethylene polymerization as before yielding only 917 g polyethylene per g solid catalyst per 30 minutes. The bulk density of the catalyst was high, 0.50 g/cc.

The relatively poor polymerization results suggest that the treatment afforded the catalyst was too severe and/or perhaps porosity or catalytic sites were deleteriously affected by the deposited AlPO$_4$ in the calcined catalyst resulting in lowered activity.

EXAMPLE 6

Catalyst Treated With HCl In Methanol-Invention 1 kg of calcined catalyst was added to the planetary mixer along with 2L of methanol containing 20 mL of concentrated hydrochloric acid and 10 mL of deionized water. Stirring was started. At first the mixture has a consistency of damp sand but within 15 minutes changed to a dough and after 30 minutes changed to a thick soup and a sample was taken. The sample was placed immediately in an 80° C. vacuum oven. Air was then blown over the stirred mixture periodically to evaporate the methanol and to maintain the mixture in the dough state. Samples were taken after 1 hour and after 3 hours, each being placed in the vacuum oven immediately as before and all three samples were dried overnight in the oven. The next day, the samples were removed, tested for hardness and after activation at 600° C. as before the bulk density of each was determined.

The test results showed that the 30 minute mixed sample was soft and its bulk density was 0.32 g/cc. The 1 hour mixed sample was moderately hard and its bulk density was 0.34 g/cc. The 3 hours mixed sample was very hard and its bulk density was 0.39 g/cc.

As was the case for $HNO_3$ in methanol (Example 2), as the treatment continued, the particle strength and bulk density of the catalyst increased. However, HCl would not be as suitable an acid for agglomerating chromium-containing catalysts to be used in ethylene polymerization since the chloride ion can act as a poison. For other catalytic purposes, the process would be acceptable.

EXAMPLE 7

Catalyst Treated With Excess $HNO_3$ In Methanol-Invention 1 kg of calcined catalyst was admixed with 2L of methanol containing 30 mL concentrated $HNO_3$ and no added water and charged to the planetary mixer. As the stirring continued the mixture passed through a wet sand texture and became doughy as in Example 2, only the transition appeared to be more rapid. A sample was taken after 30 minutes and immediately placed in the vacuum oven for drying. After 1 hour, another sample was taken and placed in the vacuum oven. After 2 hours, the volume of the mixture had decreased about ⅔ and the mixture was in 2 phases, one below the mixing blades in the form of a hard cake amounting to 64 volume % of the remaining material and one still being stirred by the blades. The upper 36% phase particles still being stirred, however, formed hard spherical beads. Sieving tests made with the beads showed the following particle size distribution: 25% was retained on 6 mesh screen, 22% was retained on 8 mesh screen, 16% was retained on 12 mesh screen, 13% was retained on 16 mesh screen, 7% was retained on 20 mesh screen, 7% was retained on 35 mesh screen, 8% was retained on 60 mesh screen, 2% was retained on 100 mesh screen and only 1% passed through the 100 mesh screen. The beads could not be broken with the unaided fingers. All samples were dried and activated at 600° C. as before.

The sample taken after 30 minutes mixing and the 35-60 mesh beads were tested for bulk density and in ethylene polymerization as before. Both of these samples were observed to retain their particle size integrity during activation.

The test results showed the beads to have a bulk density of 0.42 g/cc. Polyethylene produced with them amounted to 1860 g per g solid catalyst per ½-hour having a bulk density of 0.26 g/cc.

The 30 minute mixed sample had a bulk density of 0.38 g/cc and it produced 1740 g polyethylene per g solid catalyst per ½-hour having a bulk density of 0.22 g/cc.

The agglomeration results obtained indicate that beads of catalyst can be formed in this method. However, the relatively low polymer productivity results suggest that too much acid might have been employed which had a deleterious effect on the catalyst.

EXAMPLE 8

Catalyst Treated With Acetic Acid In Methanol-Invention 1 kg of calcined catalyst was charged to the planetary mixer along with 2L of methanol containing 40 mL of glacial acetic acid. Stirring was continued for 1 ¾ hours during which time the mixture went from a wet sand consistency to a dough state. 50 g of the calcined catalyst was added to the mixture to give it a drier consistency and small beads appeared as a result. The beads were removed and placed on a rotary disc to further help the formation of spherical beads. The product was then dried at 80° C. under vacuum and activated at 600° C. as before.

The particle size distribution of the activated beads was determined to be: 53% retained on 20 mesh screen, 42% on 100 mesh screen and 4% passed through the 100 mesh screen.

The bulk density of the 20-100 mesh portion was found to be 0.42 g/cc. It polymerized ethylene to yield 1740 g polyethylene per g solid catalyst per 30 minutes using the same reaction conditions as before. The bulk density of the polymer was 0.26 g/cc.

The results obtained show that a weaker acid than the chromium nitrate and mineral acids previously employed can be used in agglomerating the catalyst although polymerization activity was not improved as before, and particles were weaker.

The results also suggest a technique that can be employed in forming beads, e.g. adding additional dry material to the stirred dough-like mixture.

EXAMPLE 9

Crush Strength of Beads Formed In Examples 4, 7, and 8

The crush strength of the beads produced in Examples 6, 7 and 8 was determined by applying an increasing load to a bead until it crushed and noting the weight required in pounds to accomplish the crushing.

The results are set iorth in Table II.

TABLE II

| | Crush Strength of Catalyst Beads | | |
|---|---|---|---|
| Catalyst Source | Example 7 | Example 8 | Example 4 |
| Acid Employed | Nitric | Glacial Acetic | None |
| Crush Test 1, Lbs. | 12.4 | 2.7 | 0.5 |
| Crush Test 2, Lbs. | 14.2 | 2.4 | 0.8 |
| Crush Test 3, Lbs. | 14.9 | 2.3 | 1.0 |
| Crush Test 4, Lbs. | 14.0 | 2.5 | 0.8 |
| Average Strength, Lbs. | 13.9 | 2.5 | 0.8 |

The results presented in Table II illustrate that beads produced in the presence of a strong acid such as nitric acid are substantially more resistant to crushing forces than beads produced in the presence of a weak acid such as glacial acetic acid or in the absence of any acid. Even a weak acid is much more effective than no acid, however. Resistance to crushing is important in activation of beads in a fluidized bed process since attrition of the moving beads resulting from rubbing against each other with subsequent generation of fines and loss thereof overhead will be minimized. Also, since polymers tend to replicate catalyst shapes, catalyst in the form of beads or other hard particle shapes will more likely produce higher bulk density polymer, a decided advantage in subsequent processing. The examples demonstrate this effect in the high bulk densities of the polymers made with invention catalysts relative to polymers made with the control catalysts.

EXAMPLE 10

Coagglomeration Of Two Different Supports With Methanolic Chromium Nitrate-Invention 651 g of light, powdery $AlPO_4$ having a P/Al atom ratio of 0.6, previously calcined for 4 hours at 400° C., was charged to the planetary mixer. It was made in the same fashion as previously described. 72 g of a light, powdery high pore volume $Al_2O_3$, previously impregnated with 3.3 wt. % $NH_4HF_2$ and 4.0 wt. % $Si_2$ and calcined for 4 hours at 600° C., was added to the mixer followed by 1500 mL of methanol containing 55 g of $Cr(NO_3)_3 \cdot 9H_2O$. Based on the dry composite, the calculated amount of Cr present amounted to 1 wt. %.

After stirring the mixture for a few minutes it became dough-like in appearance. Mixing was continued a total of 2 hours. Near the end of this period the dough dried enough to break up into pea-sized nodules. The nodules were recovered and dried overnight in the vacuum oven at 80° C. The resultant dried hard nodules were pushed through a 35 mesh screen. It was found in a screening test that 80 wt. % of this material was retained on a 140 mesh screen.

The coagglomeration process produces catalyst particles containing two intimately associated catalysts i.e., Cr on $AlPO_4$ and Cr on $Al_2O_3$. The first portion of this unitary catalyst is capable of forming average molecular weight ethylene polymers, e.g. 100,000 weight average molecular weight, and the second portion of this unitary catalyst is capable of forming ultrahigh molecular weight polymer, e.g. 1,000,000 or more.

EXAMPLE 11

Coagglomeration Of Two Different Calcined Chromium-Containing Catalysts With Methanolic Nitric Acid-Invention 286 g of $AlPO_4$ catalyst, P/Al atom ratio of 0.9, containing 1.6 wt. % Cr, previously calcined for 4 hours at 500° C. was charged to the mixer along with 715 g of a second $AlPO_4$ catalyst, P/Al atom ratio of 0.2, containing 2.3 wt. % Cr, previously calcined for 4 hours at 400° C. The first catalyst can produce relatively low molecular weight polymer. The second catalyst can produce relatively high molecular weight polymer, both compared to the first catalyst component of Example 10.

To the mixture was added 2500 mL of methanol containing 10 mL of concentrated $HNO_3$ and 20 mL of water. The use of 2500 mL of methanol for one kilogram of total refractory material is 2.5 mL/g. Since the initial density of the refractory material is about 0.3 g/cc, the voids plus pore volume plus solid matter equal 3.3 mL/g. Since the solid matter has a density of about 2.5 g/mL the voids plus pore volume are about 3 mL/g. Thus the palor organic liquid (2.5 mL/g) is used in an amount of about 1 volume of liquid to 1 volume of total voids plus pore volume (0.83 to be exact). After stirring for 2 hours, the resulting dough was allowed to set into a hard brick during drying overnight at 80° C. in the vacuum oven.

The brick was broken up into pieces passing through a 35 mesh screen. The particles were screened as before. It was found that about 75 wt. % of the particles were retained on a 140 mesh screen.

Thus an intimate blend of 2 different catalysts was prepared by acid agglomeration. The process prevents the possibility of segregation of different catalyst species in a subsequent polymerization operation which can result in a nonhomogenous polymer blend being produced. Said blend would normally require homogenization in an extra finishing operation to make it commercially useful.

EXAMPLE 12

This example illustrates the agglomeration of a gel which has not yet been dried.

The gel used in this experiment was made like those already described. It was made to contain P/Al=0.6. After being washed twice in water and twice more in isopropanol, it was filtered and pressed into a cake. Had it been dried at this point a light fluffy powder would have been obtained, as in the previous examples, with low bulk density and a large amount of fines. Instead, 6.67 Kg of this cake (corresponding to 1.0 Kg of dry catalyst) was placed in the planetary mixer. While the gel was stirred gently at a speed of 28 rpm, a solution was added containing 15 mL of concentrated nitric acid, 25 mL of water, and 200 mL of methanol. An air hose was then added above the gel to encourage evaporation of the alcohol while the stirring speed was increased to 60 rpm. A paste formed at first, but with continued stirring and evaporation, the consistency thickened until by about 3 hours the mass began to break up into particles. After 3 hours and 45 minutes, pea-size spheres were formed. A sample of this material was dried in a vacuum oven overnight. The spherical particles hardened into well shaped dry catalyst beads, which required considerable effort to break between the fingers. Indeed, some could not be broken.

The rest of the mass continued to be stirred until by 4 hours and 15 minutes a granular powder was obtained. This also was dried overnight in a vacuum oven at 80° C. It had a high bulk density of 0.50 g/cc. The following particle size was measured.

60% remained on 60 mesh
7% 60–100 mesh
9% 100–200 mesh
24% through 200 mesh

EXAMPLE 13

$SiO_2$-$AlPO_4$ Coagglomeration

This example shows that two completely different catalysts, such as a silica and an aluminophosphate, can be coagglomerated by the process of this invention, giving an intimate mixture of catalysts but welded together into uniform particles.

Into a planetary mixer were weighed (A) 1.0 Kg of commercial Davison grade 952 silica (PV=1.6 cc/g; SA=280 $m^2$/g), and (B) 4.8 Kg of an aluminophosphate hydrogel (P/Al=0.4, made by the melt method, washed in n-propanol but not dried). Since this hydrogel was 21% solids by weight this amounts to a 50–50% mixture, although in principle any ratio could be used. Then 2.0 liters of methanol was added and the mixture stirred over about 30 minutes into a dough-like consistency. Next 231 gm of solid $Cr(NO_3)_3 \cdot 9H_2O$ was spooned into the planetary mixer, enough to yield 1.5% Cr on the final catalyst. The mixture then immediately changed into a thin soup-like consistency, which is evidence that the acidity caused a peptization since no other liquid was added to thin the mixture. Nitrogen was then blown over the mixture during the next 1.5 hours to evaporate some of the alcohol, while stirring was continued. After 1.5 hours a homogeneous clay-like consistency was obtained.

This clay was then processed through a modified Stokes Toronado Mill, equipped with air blower to provide simultaneous evaporation and disintegration. The blades were removed from the mill so that only the "hammers" operated on the clay, beating it at high velocity and further working the ingredients together. Two cyclones caught the partially dried clay particles as they exited the 60 mesh screen. Final drying was done in the vacuum oven at 80°–90° C. overnight.

The process produced rounded particles of very uniform size (<5% fines) well suited to fluidized bed applications. This catalyst was then activated and used in the pilot plant to make film grade ethylene polymer. It had good activity (4–5000 g/g) and handled well, without segregation.

EXAMPLE 14

Agglomeration of Tergel Fines

In the commercial manufacture of catalyst, the finest material is often screened out and discarded because it creates difficulties in handling. In this example these fines were reclaimed by the process of this invention.

One Kg of a commercial high porosity silica-titania catalyst containing 1% Cr, which silica had been rejected from the commercial manufacture because all of it had passed through a 325 mesh screen (<50 micron opening), was weighed into a planetary mixer. Then 3.3 liters of methanol were added containing 5 mL of concentrated nitric acid and 10 mL of water. This gave a wet-sand consistency which was then worked by the planetary blades at a speed of 5 for two hours, giving a paste. The paste was poured into a pan and dried overnight in the vacuum oven at about 80°–90° C. This yielded a hard brick which was then crushed in a corn-grinder giving a coarse powder essentially free of fines. The improved particle size analysis is shown below.

| | |
|---|---|
| on 35 mesh | 25% |
| on 100 mesh | 46% |
| on 200 mesh | 16% |
| on 325 mesh | 7% |
| through 325 mesh | 6%. |

This reclaimed material was then blended back into normal catalyst in a ratio of 1:4. That is, the fines were separated, reclaimed, and added back to the good material in about the same ratio (the fines constituted about 20–25 percent of the original catalyst).

Polyethylene film was made from this reclaimed material, as well as from a control containing no reclaims. The properties of the film, which are shown below, suggest no deterioration in the quality of the reclaimed catalyst. In fact they are essentially identical.

| | Control | Invention |
|---|---|---|
| Melt Index | 0.18 | 0.16 |
| Density (g/cc) | 0.9378 | 0.9372 |
| Dart Impact (g) | 184 | 182 |
| Spencer Impact (joule) | 0.53 | 0.55 |
| Tear Resistance | | |
| MD (g) | 45 | 46 |
| TD (g) | 784 | 771 |
| Productivity | 3390 | 3570 |

Thus the invention permits 100% recovery of catalyst without loss of important catalyst properties.

EXAMPLE 15

Fluoride Agglomeration of Alumina

This example illustrates the agglomeration of an alumina. In this case the acid was also a fluoriding agent.

Into a planetary mixer was weighed 1.5 Kg of Davison HPV alumina, a fine fluffy material (~50% through 325 mesh) containing a high surface area and pore volume (SA=530 m$^2$/g, PV=2.7 mL/g). While stirring, 2.0 liters of methanol was added containing (dissolved in it) 44.8 g of ammonium bifluoride, NH$_4$ HF$_2$. This formed a wet sand which was worked by the planetary mixer for 30 min., another 500 mL of methanol being added to replace evaporation losses. Then 128 gm of Silbond 40, a commercial ethyl polysilicate (40% SiO$_2$) from Stauffer was added along with 200 mL methanol. Thus the alumina surface was treated with fluoride and also coated with about 4% silica during the peptization. Another 1400 mL of methanol was then added to cause the mixture to finally become sticky and become a thick paste. It was then worked by the mixer blades at a speed of 4 for 1½ hours. Finally the dough was processed through a modified Stokes Toronado Mill, previously described, which broke it up into many small rounded particles passing through a 30 mesh screen. These were dried in the vacuum oven at 80°–90° C. overnight.

The result was a special highly acidic catalyst preparation of fluorided, silica-coated alumina, with round hard particles excellent for fluidized bed applications, but still highly porous—a difficult combination to achieve. The final particle size distribution was as follows.

| | |
|---|---|
| 30–60 mesh | 46% |
| 60–100 mesh | 36% |
| 100–200 mesh | 11% |
| 200–325 mesh | 1% |
| fines | 0%. |

EXAMPLE 16

Film From Polymer Produced With Acetic Acid Treated Hydrogel

This example illustrates the production of high density polyethylene film.

Two catalysts were made in this example from an aluminophosphate catalyst base having the same P/Al ratio and made by the melt method. Catalyst A was made by the methods already described, that is from the dry calcined powder, chromium nitrate being used for acid peptization. Catalyst B was made from the hydrogel, washed in isopropanol to displace water, but not yet dried. Isopropanol was used in the agglomeration of both catalysts instead of methanol, giving somewhat softer particles.

Catalyst A 2.0 Kg of the dry calcined powder was weighed into a planetary mixer. Then was added 2.0 liters of isopropanol containing 77 gm Cr(NO$_3$)$_3$·9H$_2$O dissolved. Another 200 mL of isopropanol was added to bring the mixture to the consistency of a dough, which was then worked in the planetary mixer at a speed of 3.5 for 2 hours. The dough was then poured into pans and dried overnight in a vacuum oven at 80°–90° C. to form a brick. Finally it was pushed through a 50 mesh screen and delivered to a pilot plant for polymerization testing.

Catalyst B

This run started with 6.67 Kg of isopropanol washed virgin hydrogel containing 14.6% solids (that is, 1.0 Kg dry weight). Then 100 mL of acetic acid was added in 200 mL isopropanol to neutralize adsorbed ammonia (otherwise the peptization does not work as well). This left a weakly acidic mixture. At this point 75 gm of $Cr(NO_3)_3 \cdot 9H_2O$ was added and the dough which formed was worked at speed 3.5 for 2 ¾ hours, adding isopropanol occasionally to replace evaporation. Finally the dough was cast into a brick and dried overnight as before, followed by the same grinding procedure. It too was delivered to the pilot plant for evaluation.

In both Catalyst A and Catalyst B the agglomeration step reduced fines successfully. However in Catalyst B a surprising improvment was obtained in the properties of film from polymer made using the catalyst as is shown below in Table III. This shows a further advantage for using an acid such as acetic acid and agglomerating before any calcining.

TABLE III

| Run | Prep.[1] | Pellet HLMI | HLMI MI | Dart Drop | Bell ESCR, hrs. | Flex. Mod. MPa |
|---|---|---|---|---|---|---|
| A | — | 11.2 | 112 | 153 | 554 | 1374 |
| B | Acetic Acid | 12.7 | 115 | 223 | >1000 | 1294 |

[1]in addition to the $Cr(NO_3)_3 \cdot 9H_2O$ which acts as an acidic material and the isopropyl alcohol.

While this invention has been described in detail for the purpose of illustration it is not to be construed as limited thereby but is intended to include all changes and modifications within the spirit and scope thereof.

That which is claimed is:

1. A method of reducing fines in a refractory material comprising:
   (a) combining an acidic composition in a liquid polar organic compound with said refractory material to provide a workable mixture of liquid and solids;
   (b) working said mixture until a decrease in volume of the solids occurs; and
   (c) drying the thus worked material.

2. A method according to claim 1 wherein said refractory material is silica or silica-titania.

3. A method according to claim 1 wherein said refractory material is alumina.

4. A method according to claim 1 wherein said refractory material is aluminum phosphate having a phosphorous:aluminum ratio within the range of 0.2:1 to 0.6:1.

5. A method according to claim 1 wherein said acidic composition is one of nitric acid, hydrochloric acid, acetic acid and chromium nitrate.

6. A method according to claim 1 wherein said acidic composition is a fluoride.

7. A method according to claim 6 wherein said fluoride is selected from ammonium silicafluoride and ammonium bifluoride.

8. A method according to claim 7 wherein said refractory material comprises aluminum phosphate.

9. A method according to claim 1 wherein said refractory material comprises silica.

10. A method according to claim 1 wherein said refractory material is alumina.

11. A method according to claim 1 wherein said refractory material is magnesia.

12. A method according to claim 1 wherein said liquid polar organic compound is an alcohol, containing up to 10 wt. % water.

13. A method according to claim 12 wherein said alcohol is methanol.

14. A method according to claim 1 wherein said refractory material is a solid particulate material, wherein said liquid polar organic compound is used in an amount within the range of about 0.1 to 2 times the total volume of voids and pores in said refractory material and wherein said worked material is shaped before drying.

15. A method according to claim 1 wherein said liquid polar organic compound is used in an amount sufficient to impart initial incipient wetness to the refractory material.

16. A method according to claim 1 wherein said working is carried out for a time period within the range of 10 minutes to 15 hours.

17. A method according to claim 1 wherein said refractory material is a solid particulate material and wherein said worked material is shaped by extrusion before said drying.

18. A method according to claim 1 wherein said working is done in a manner analogous to kneading bread dough and as said working takes place and free liquid is released, the thus released liquid is evaporated.

19. A method according to claim 18 wherein said working is continued and said liquid is evaporated so as to give a more viscous composition than when liquid was first released, said working stopping short of carrying the consistency of the resulting mass to a solid.

20. A method according to claim 18 wherein after working said mixture and evaporating free liquid to give a more viscous mass, additional particulate dry refractory material is added.

21. A method according to claim 1 wherein said refractory material is a combination of refractory materials.

22. A method according to claim 21 wherein said combination comprises aluminum phosphate and alumina.

23. A method according to claim 21 wherein said combination comprises aluminum phosphate and silica.

24. A method according to claim 21 wherein said refractory material is a combination of two aluminum phosphates.

25. A method according to claim 1 wherein said refractory material is fines resulting from catalyst production.

26. A method according to claim 25 wherein said fines are silica fines have a particle diameter less than 50 microns.

27. A method according to claim 1 wherein said refractory material is aluminum orthophosphate, said liquid polar organic compound is methanol, said methanol is combined in an amount sufficient to impart initial incipient wetness to said aluminum orthophosphate and wherein said acidic composition is selected from nitric acid, hydrochloric acid, acetic acid and chromium nitrate.

28. A method according to claim 27 wherein said acidic composition is hydrochloric acid.

29. A method according to claim 27 wherein said acidic composition is nitric acid.

30. A method according to claim 27 wherein said acidic composition is acetic acid.

31. A method according to claim 27 wherein said acidic composition results from the use of chromium nitrate.

32. A method according to claim 1 wherein said refractory material is gelled in the presence of a water-soluble acrylamide polymer.

33. A method according to claim 1 wherein said refractory material is a solid particulate material and wherein said worked material is shaped prior to said drying.

34. A method according to claim 27 wherein said refractory material is a gel.

35. A method according to claim 34 wherein said gel is a hydrogel.

36. A method according to claim 34 wherein said gel is a hydrogel which has had at least a portion of water in pores thereof replaced with a polar organic compound.

37. A method according to claim 36 wherein said polar organic compound is methanol.

38. A method according to claim 37 wherein said refractory material is aluminum phosphate, and said acidic composition is selected from nitric acid, hydrochloric acid, acetic acid and chromium nitrate.

39. A method according to claim 38 wherein said acidic material is chromium nitrate.

40. A method according to claim 1 wherein an organic silicate is also present during said working.

41. A method according to claim 1 wherein said refractory material is a hydrogel, said acidic material is an acid and wherein said working occurs before any calcining.

42. A method according to claim 41 wherein said hydrogel is aluminum phosphate having a P/Al atom ratio of 0.2:1 to 0.6:1 and wherein said acid is acetic acid.

43. A method according to claim 1 wherein said refractory material is a solid particulate material and wherein said worked material is shaped prior to said drying and calcined in air.

44. A method according to claim 43 wherein said refractory material contains in addition a catalytic amount of chromium.

45. A method of reducing fines in a refractory material consisting of
(a) combining an acidic composition in a liquid polar organic compound with said refractory material to provide a workable mixture of liquid and solids;
(b) working said mixture until a decrease in volume of the solids occurs; and
(c) drying the thus worked material.

46. A method according to claim 45 wherein said refractory material is silica or silica-titania.

47. A method according to claim 45 wherein said refractory material is alumina.

48. A method according to claim 45 wherein said refractory material is aluminum phosphate having a phosphorous: aluminum ratio within the range of 0.2:1 to 0.6:1.

49. A method according claim 45 wherein said acidic composition is one of nitric acid, hydrochloric acid, acetic acid and chromium nitrate.

50. A method according to claim 45 wherein said acidic composition is a fluoride.

51. A method according to claim 50 wherein said fluoride is selected from ammonium silicofluoride and ammonium bifluoride.

52. A method according to claim 61 wherein as said working takes place free liquid is released, the thus released liquid is evaporated so as to give a more viscous composition than when liquid was first released, and said working is stopped short of carrying the consistency of the resulting mass to a solid.

53. A method according to claim 45 wherein said refractory material is the fines resulting from the processing of prior refractory material wherein said fines have been separated from said prior refractory material.

54. A method according to claim 53 wherein said fines are from a silica-titania-chromium tergel catalyst, said fines having a particle diameter of less than 50 microns and said acidic composition in a liquid polar organic compound is $HNO_3$ in methanol and thereafter activating the resulting composition in air at a temperature within the range of 300 to 800° C. for a time of 1 minute to 48 hours.

55. A method according to claim 45 wherein said refractory material is a solid particulate material and wherein said polar organic compound is used in an amount within the range of 0.1 to 2 times the total volume of voids and pores in said refractory material.

56. A method according to claim 55, wherein said acidic material is one of nitric acid, hydrochloric acid, acetic acid, chromium nitrate, ammonium silicofluroide and ammonium bifluoride and wherein said mixing is carried out in one of a planetary mixer, a pin granulater, a sigma mixer or a banbury-type mixer.

57. A method of reducing fines in a particulate refractory material selected from aluminophosphate having a phosphorus to aluminum ratio within the range of 0.2:1 to 0.6:1, mixtures of aluminophosphate and silica, silica-titania-chromium tergel fines, and alumina consisting of
(a) combining an acidic composition selected from nitric acid, hydrochloric acid, acetic acid and chromium nitrate in a liquid polar organic compound selected from methanol and isopropanol with said refractory material to provide a workable mixture of liquid and solids;
(b) working said mixture until a decrease in volume of the solids occurs; and
(c) drying the thus worked material.

* * * * *